C. DE LUKACSEVICS.
RESILIENT TIRE.
APPLICATION FILED APR. 11, 1913.
1,139,260.
Patented May 11, 1915.
2 SHEETS—SHEET 2.
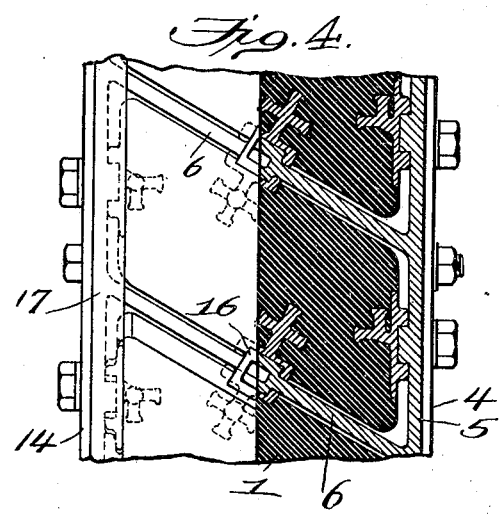
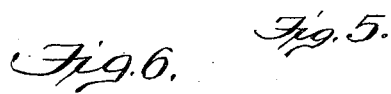
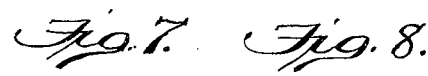
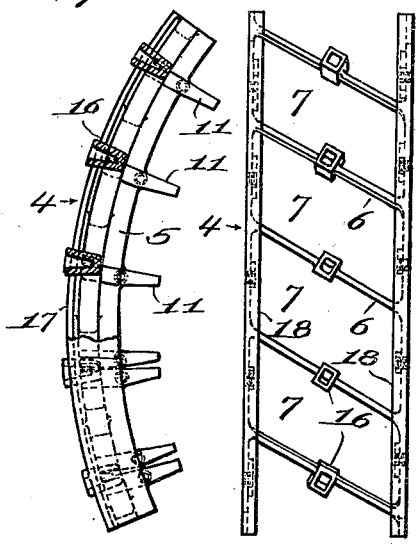

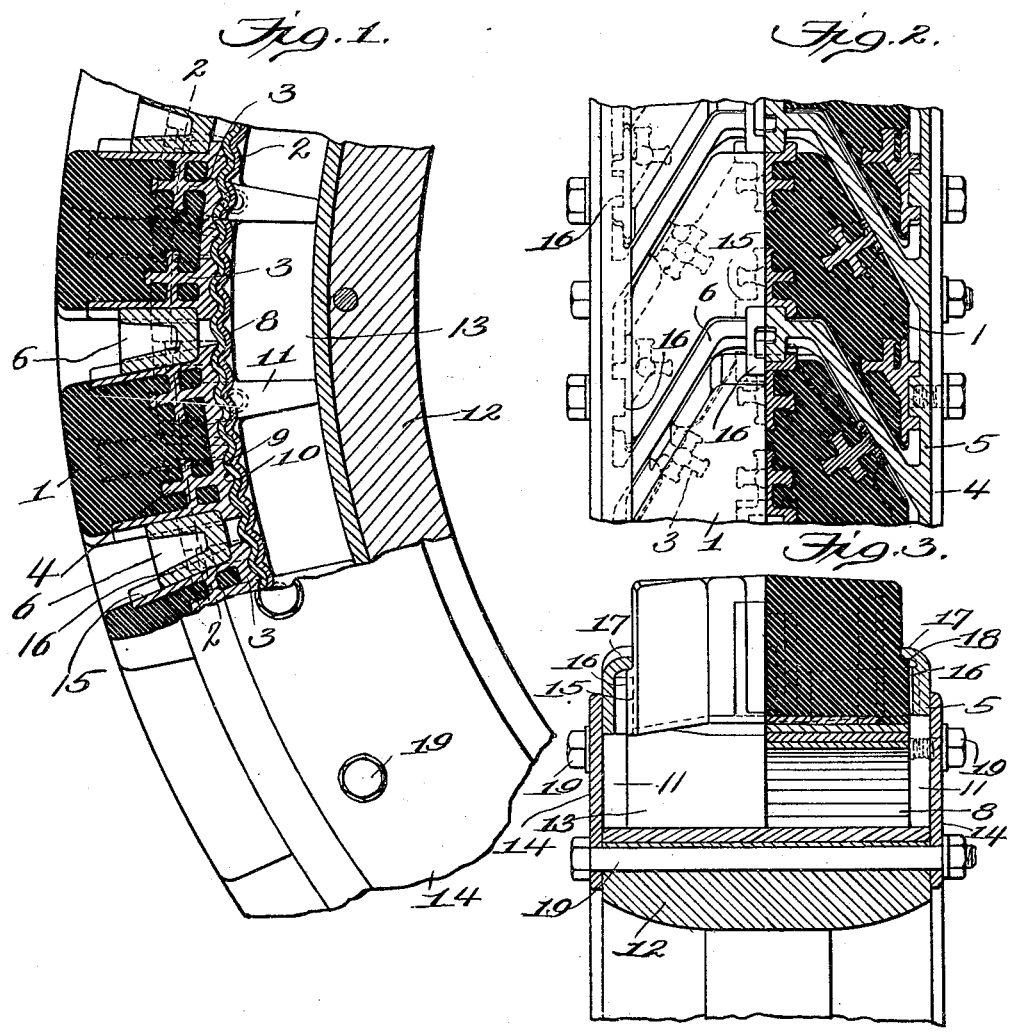

UNITED STATES PATENT OFFICE.

CHARLES DE LUKACSEVICS, OF WEST NUTLEY, NEW JERSEY, ASSIGNOR TO WILLIAM H. DANE, OF EAST ORANGE, NEW JERSEY.

RESILIENT TIRE.

1,139,260.  Specification of Letters Patent.  Patented May 11, 1915.

Application filed April 11, 1913.  Serial No. 760,513.

*To all whom it may concern:*

Be it known that I, CHARLES DE LUKACSEVICS, a citizen of the United States, residing at West Nutley, in the county of Essex and State of New Jersey, have invented new and useful Improvements in Resilient Tires, of which the following is a specification.

This invention relates to improvements in resilient tires and it proposes a tire of that type which embodies a plurality of radially yieldable spring supported tread elements.

The objects of the invention are to provide a tire which shall have good wearing properties in that the movements of the tread elements are without due friction; which shall have good riding properties in that the movements of the tread elements are effectively cushioned; which shall not be liable to derangement in that no parts of delicate nature are employed; and in which the parts are readily accessible for the purposes of cleaning, renewal, or repairs.

Embodiments of the invention are illustrated in the accompanying drawings, wherein:—

Figure 1 is a view showing a portion of a tire in which the features of the invention are incorporated, partly in side elevation and partly in longitudinal section; Fig. 2 is a view partly in plan and partly in section on the line 2—2 of Fig. 1; Fig. 3 is a cross sectional view showing one of the tread elements partly in end elevation and partly in cross-section; Fig. 4 is a view generally similar to Fig. 2, showing more in detail the relation of the skeleton frame as well as a modified form of tread elements; Fig. 5 is a plan view of the skeleton frame for the tread elements for use in the form shown in Figs. 4 and 7. This frame, except for changes in the shape of the bars in which the tread elements are confined, is of the same construction as the frame which is employed in the forms shown in Figs. 1 and 2. Fig. 6 is a view partly in side elevation, and partly in central longitudinal section, of the frame shown in Fig. 5; Figs. 7 and 8 are plan and side elevations, respectively, of a base plate which forms a part of each tread element. In these figures the shape of the base plate is selected with reference to the form of tread element used in the construction shown in Fig. 4, but its structure is generally the same as the base plate which forms a part of the tread element used in the construction shown in Figs. 1 and 2.

Similar characters of reference designate corresponding parts throughout the several views.

Generally described, the improved tire is made up of a plurality of radially yieldable tread elements, a frame which confines the tread elements, and a spring support which acts on the tread elements, and the invention consists in the structural character of these parts and the relation which they bear to one another.

Each tread element consists of a rubber body 1 which is preferably solid and a base 2, to which the body is joined. The base 2 is preferably provided with anchorage lugs 3 which may be star-shaped or cross-shaped, as shown, and which, when the body 1 is molded on said base, obviously permanently and securely anchor the body to the base.

The skeleton frame which confines the tread elements is shown at 4 and is preferably made in a relatively large number, *e. g.* ten, of counterpart conterminously arranged section, each section having a capacity for a certain number, *e g.*, three or four, of tread elements. Thus, Fig. 5 shows one of the counterpart sections of the frame 4. The frame 4 includes side bars 5 and cross bars 6, these bars defining inclosures 7 for the respective tread elements. The shape of the bars 6 and consequently, of the inclosures 7, corresponds to the shape of the tread elements and these latter may be of any form desired. Thus, in Fig. 2, the tread elements are V-shaped and in Fig. 4 they are lozenge shaped.

The support for the tread elements preferably comprises a continuous spring 8 which is, of course, annular, and may embody any desired number of concentric leaves or laminæ. The bases 2 rest upon the spring 8 and are preferably engaged therewith as by intermatching corrugations; that is to say, the bases 2 have their inner faces corrugated as at 9, and the spring 8 has its outer face corrugated as at 10, the corrugations matching, as shown. The office of the corrugations 10 is to prevent the spring from creeping with reference to the tread elements and to prevent the tread elements from canting in the direction of the plane of the wheel; and also to impart sufficient flexibility to the spring, without impairing its strength, whereby the spring will not be affected by the continuous deformation to which it is subject. Both leaves of the spring are preferably corrugated as shown.

The side bars 5 of the frame 4 are preferably provided with inwardly extending radially disposed lugs 11, which serve the three-fold purpose of supporting the frame in relation to the usual rim 12 and of providing for an annular chamber 13 between the rim and the tread blocks, in which chamber the spring 8 has its necessary play; of centering the spring 8 in the plane of the wheel, i. e. of preventing lateral movements of said spring; and of providing for the positive attachment of the frame 4 upon the rim. For this latter purpose, the lugs 11 are provided with threaded holes to receive the screws or equivalent devices 19, by which the frame 4 is secured to the side flanges 14, which, in turn, form a part of, or are secured to the rim 12.

In order that the tread elements may be positively guided in their radial movements, the base plates 2 are provided with guides 15, and these guides are preferably formed adjacent, and as parts of, the anchorage lugs 3. The guides 15 project slightly beyond the adjoining surfaces of the rubber bodies 1 and engage the side bars 5, and the cross bars 6 of the frame 4. The guides 15 may be of any desired form. Thus, in Fig. 2, some of the guides are flat and others are U-shaped, whereas in Fig. 4 all of the guides are U-shaped. When U-shaped guides are employed, the bars of the frame 4 are provided with lugs or projections 16 for engagement thereby.

In order to limit the outward displacement of the tread elements, the side bars 5 of the frame 4 are provided at their outer edges with inturned flanges 17, which overhang the guides 15 at the sides of the tread elements, and are normally engaged by said guides. The rubber bodies 1 may be formed with shoulders 18, also to engage the flanges 17, if so desired.

The spring 8 virtually forms a yielding bottom or base-wall for all of the inclosures 7 and holds the tread elements in normal relation, with their guides 15 engaging against the flanges 17 of the bars 5. Owing to the fact that the tread elements meet the ground and leave the ground at an angle, there is a tendency for said tread elements to cant in the plane of the wheel, and this canting action promotes friction and undue wear and detracts from the easy riding properties of the tire. In the construction disclosed, this canting action is counteracted, partly by the length and arrangement of the guides 15, and the surfaces which they engage, and partly, and to the greater extent, by the relation which obtains between the bases 2 and the spring 8, whereby these elements are provided with intermatching corrugations which hold the tread elements at all times in definite relation to the spring and prevent the spring from creeping as a consequence of its continuous deformation. In other words, the tread blocks move in a true radial direction, without any end-wise thrust, and the thrust arising from the deformation of the spring is uniformly transmitted to and resisted by those tread blocks which are not in engagement with the ground.

Having fully described my invention, I claim:

1. In a resilient tire, tread elements, each comprising a base and a rubber body joined thereto, a frame having inclosures for the tread elements, and an annular spring forming a base wall common to said inclosures and upon which the tread elements rest, the bases having corrugated faces and the spring having corrugations, the tread elements having corrugated inner faces and the spring having corrugations to match the corrugated inner faces of the tread elements.

2. In a resilient tire, tread elements, each comprising a base and a rubber body secured thereto, the base having a plurality of guides which project slightly beyond the rubber body, a frame having inclosures for the tread elements, the walls of the inclosures being engaged by said guides, and a corrugated annular spring support for the tread elements, the bases having corrugations to match and engage the corrugations of the spring support.

3. In a resilient tire, tread elements, each comprising a base and a rubber body molded thereon, the base having anchorage lugs incorporated in the body and having guides adjoining and formed with the lugs and which project slightly beyond the rubber body, a frame having inclosures for the tread elements, the walls of the inclosures being engaged by said guides, and a spring support for the tread elements.

4. In a resilient tire, tread elements, a frame having side bars defining inclosures for the tread elements and having lugs projecting radially and inwardly from its side bars, a felly upon which said lugs engage, an annular spring supporting the tread elements and arranged between the lugs and also between the tread elements and the felly, the tread elements having projecting guides, the side bars having inturned flanges which overhang and are engaged by said guides, and annular side flanges secured to said felly and overlying and also secured to said lugs.

In testimony whereof I have hereunto set my hand in presence of two subscribing witnesses.

CHARLES DE LUKACSEVICS.

Witnesses:
WILLIAM A. KISTLER,
PHILIP C. SCHUYLER.